United States Patent [19]
Villot et al.

[11] Patent Number: 5,573,799
[45] Date of Patent: Nov. 12, 1996

[54] STABILIZING CURED MEAT COLOR WITH ENCAPSULATED IRON SALTS

[75] Inventors: Dominique Villot, Helsingborg; Christer Zander, Angelholm, both of Sweden

[73] Assignee: Nestec S.A., Vevey, Sweden

[21] Appl. No.: 371,990

[22] Filed: Jan. 12, 1995

[30] Foreign Application Priority Data

Feb. 17, 1994 [EP] European Pat. Off. .............. 94102350

[51] Int. Cl.⁶ ...................................................... A23B 4/02
[52] U.S. Cl. ........................... 426/262; 426/264; 426/324; 426/332; 426/575; 426/577
[58] Field of Search ................................. 426/262, 264, 426/575, 271, 324, 332, 266, 129, 577

[56] References Cited

U.S. PATENT DOCUMENTS

| | | | |
|---|---|---|---|
| 3,780,192 | 12/1973 | Danner | 426/266 |
| 4,018,907 | 4/1977 | Scarpellino | 426/250 |
| 4,018,934 | 4/1977 | Parliment | 426/540 |
| 4,279,936 | 7/1981 | Jones et al. | 426/265 |
| 4,559,234 | 12/1985 | Rubin et al. | 426/250 |
| 4,781,934 | 11/1988 | Shimp et al. | 426/264 |
| 5,230,915 | 7/1993 | Shahidi et al. | 426/240 |
| 5,345,069 | 9/1994 | Grindrod | 426/103 |

*Primary Examiner*—Esther Kepplinger
*Assistant Examiner*—Lien Tran
*Attorney, Agent, or Firm*—Vogt & O'Donnell, LLP

[57] ABSTRACT

The color of cured comminuted meat is stabilized by curing comminuted meat with a curing medium containing an edible iron salt encapsulated in an edible thermoresistant and oxygen-permeable material.

11 Claims, No Drawings

STABILIZING CURED MEAT COLOR WITH ENCAPSULATED IRON SALTS

BACKGROUND OF THE INVENTION

The present invention relates to a process for stabilising the colour of cured, cooked comminuted meat products during storage.

Light-induced discolourisation of sliced and gas-packed charcuterie products during display in illuminated cabinets in supermarkets, is a frequent problem, due to high levels of oxygen in the packages and is caused by the presence in the cured, cooked charcuterie products of a pink pigment which is not stable to oxygen in the presence of light and which turns brown on storage. The oxygen present in the pack may come from either the production process, the product itself, or from the exterior if the film of the package is not an efficient barrier. Acceptable colour stability can be achieved by adding oxygen scavengers, such as AGELESS absorbent product manufactured by Mitsubishi Gas Chemical Company, Inc., to the package. AGELESS product is an oxygen absorber based on iron powder which is produced in small pouches, and effectively binds residual oxygen. In U.S. Pat. No. 3,780,192, there is described a process for accelerating the cure colour in meat by adding iron or an iron salt to the curing medium in the presence of an enediol or diketone reducing agent. It is also known to use encapsulated iron with lipid coatings for food fortification with iron.

Although added ferrous and ferric salts consume oxygen in cured, cooked charcuterie products and protect against discolourisation during display, the products become, initially, an undesirable yellow.

SUMMARY OF THE INVENTION

We have now found, surprisingly, that iron salts encapsulated with a thermoresistant capsule which is permeable to oxygen are capable of stabilising the colour of cured, cooked charcuterie products without the formation of an undesirable yellow colour.

Accordingly, the present invention provides a process of curing comminuted meat which comprises adding an edible iron salt to the curing medium, characterised in that the iron salt is encapsulated with an edible thermoresistant capsule which is permeable to oxygen.

DETAILED DESCRIPTION OF THE INVENTION

In carrying out the process of the present invention, the iron salt is preferably, although not necessarily, a water-soluble salt and may be a ferrous or ferric salt, for instance, a sulphate, chloride, phosphate or fumarate.

The amount of the iron salt (measured as elemental iron) added to the curing medium may be from 10 to 100 ppm, preferably from 15 to 80 ppm and especially from 20 to 50 ppm by weight based on the total weight.

The thermoresistant capsule is preferably made of a material which is impermeable or substantially impermeable to the iron salt and is preferably insoluble or substantially insoluble in cold water, e.g. water at ambient temperature or below, e.g. from 20° to 35° C. By "thermoresistant" in this invention, we mean that the capsule does not break down at the cooking temperature of the meat, e.g. from 70° to 80° C. Examples of suitable materials are edible polymers such as substantially cold water-insoluble polysaccharides or gums e.g. agar, pectin. The amount of capsule material may be from 60 to 600 ppm and preferably from 120 to 300 ppm by weight, based on the total weight.

The encapsulation of the iron salt may, for example, be performed by conventional encapsulation techniques or by mixing or dispersing the iron salt in a solution or dispersion of the capsule material and drying or setting into a gel according to the nature of the capsule material. The encapsulated iron salt may contain from 0.3 to 3%, preferably from 1 to 2.75% by weight of iron salt (measured as iron), from 2 to 20%, preferably from 4 to 10% by weight of the capsule material and from 85 to 95% by weight of water, each based on the total weight of the gel. If desired, up to 10% by weight of dextrose may be added based on the weight of the gel.

The amount of the encapsulated iron salt added to the curing medium may be from 0.1 to 1.0%, preferably from 0.2 to 0.6% and especially from 0.25 to 0.5% by weight based on the total weight.

Any conventional curing medium may be used, e.g. one containing sodium nitrate, potassium nitrate, sodium nitrite or potassium nitrite or any mixture thereof together with a reducing agent such as sodium ascorbate or sodium isoascorbate with the addition of sodium chloride, sugar and spices. The curing medium may be used either in the dry form or dissolved in water to form a pickle.

Preferably, the encapsulated iron salt is added shortly before the end of the comminution of the meat, preferably together with the reducing agent. The comminution and the curing may conveniently be carried out at a temperature from 2° to 15° C. and preferably from 4° to 12° C.

After curing, the comminuted meat is cooked and gas-packed. In the case of a meat sausage, the comminuted meat is filled into casings, e.g. under vacuum, and then may be dried and smoked before cooking after which it is sliced and gas packed.

EXAMPLES

The following Examples further illustrate the present invention. Parts and percentages are given by weight unless otherwise stated.

Example 1

A curing medium was prepared consisting of the following ingredients:

| Ingredients | Parts by weight |
| --- | --- |
| Meat/fat | 77.93 |
| Curing Salt * | 1.95 |
| Sodium ascorbate | 0.04 |
| Sodium tripolyphosphate | 0.20 |
| Spices | 0.39 |
| Water (as ice) | 19.49 |

* The curing salt consisted of 0.6 parts sodium nitrite and 1.35 parts sodium chloride.

This mixture was placed in a chopper and comminuted to give a sausage mix over a period of 20 minutes.

An encapsulated ferric phosphate was prepared by dispersing 3.5 parts of ferric phosphate and 0.1 part of dextrose into an aqueous solution containing 5 parts of agar and 91.4 parts of water at 60° C. and then allowing to set by cooling. The gel formed was cut in small cubes (3×3×3 mm) and added together with 10 parts of sodium ascorbate in an amount of 0.31% to the sausage mix shortly before the end of the chopping cycle at 10° C.

The comminuted meat was vacuum filled into collagen casings having a diameter of 90 mm, dried for 20 minutes at 60° C. and cooked at a temperature of 78° C. in a cooking chamber until the core temperature was 72° C. Afterwards, the sausages were showered with cold water for 60 minutes for cooling and then stored for one day in a chilling room at 2° C. The sausages were cut into slices 1.4 mm thick, and batches containing 10 slices were gas packed in modified atmosphere packages (2 mm headspace, 20% CO2, 80% N2).

In order to determine the colour stability of the sausages, colour measurements were made on opened samples with a Minolta Chromameter:

a) directly after packaging (I)
b) after 12 days storage in the dark (II), and
c) after 12 days storage—4 days in the dark and 8 days under the light (III) (2000 lux, 13 hours per day).

Comparisons were made with sausages containing no additives (Ref), an equivalent amount of agar alone and iron alone and the results are shown in Table 1 in which the redness of the samples is indicated by a* and the yellowness by b*. It should be noted that:

a difference of 1 in redness or yellowness between two samples is not visible, and the ground colour is acceptable when a* appears greater than or equal to b*

TABLE 1

| Time after packaging | Ref. a*/b* | Agar alone a*/b* | Iron salt in agar a*/b* | Iron salt alone a*/b* |
|---|---|---|---|---|
| I | 12.1/9.7 | 12.1/9.6 | 11.6/9.7 | 11.3/11.4 |
| II | 11.7/9.6 | 11.9/9.6 | 11.1/10.8 | 10.8/13.3 |
| III | 5.0/11.5 | 6.5/11.6 | 9.9/10.2 | 10.0/12.6 |

During these trials, the residual oxygen after packaging was abnormally high (1% in the reference after 12 days), which explains the magnitude of the discolouration, and some discolouration in light for the samples with iron. When encapsulated in agar gel, the iron salts provide colour stability in light and produce much less non-light dependent discolouration when compared with iron salt alone. It is apparent that when iron salts are added in encapsulated form, they provide an acceptable colour, stable under light.

After 5 weeks storage, no effect on microbial growth, no or very little effect on the sensory properties and no effect on the rancidity were observed.

Example 2

A similar procedure to that described in Example 1 was followed except that 2.5 parts of ferric phosphate were dispersed into the encapsulating medium. The redness and yellowness (a*/b*) of samples of sausages after 1, 2 and 3 weeks storage compared with a reference sample containing no additive are shown in Table 2.

TABLE 2

| Time after packaging | Ref. | 1 week | 2 weeks | 3 weeks |
|---|---|---|---|---|
| I | 12.3/9.8 | 11.4/9.8 | 11.2/11.1 | 11.5/10.5 |
| II | 11.3/10.1 | 11.5/10.8 | 11.3/11.2 | 11.0/11.5 |
| III | 9.7/10.5 | 10.7/10.5 | 11.0/11.0 | 10.9/11.7 |

Even after 33 days storage in light, the colour of the sausage with encapsulated iron was still stable under the light. During storage, the redness of the whole sausage was very stable and although the yellowness tended to increase the colour was still acceptable.

We claim:

1. In a process for obtaining a cured comminuted meat wherein a curing medium is incorporated into the comminuted meat and the comminuted meat is cured by the medium, the improvement comprising curing a comminuted meat with a curing medium containing an edible iron salt encapsulated in an edible thermoresistant and oxygen-permeable gelled material.

2. A process for stabilizing the color of a cured comminuted meat comprising curing comminuted meat with a curing medium which contains an edible iron salt encapsulated in an edible thermoresistant and oxygen-permeable gelled material.

3. A process according to claim 1 or 2 further comprising first comminuting a meat in the presence of a curing medium to obtain a mixture, and then adding the encapsulated iron salt to the mixture and further comminuting the mixture and added encapsulated iron salt.

4. A process according to claim 1 wherein, after curing the comminuted meat containing the encapsulated iron salt to obtain a cured comminuted meat, cooking the cured comminuted meat to obtain a cooked comminuted meat and then gas packing the cooked comminuted meat with a gas selected from the group consisting of carbon dioxide and nitrogen.

5. A process according to claim 1 or 2 wherein the iron salt is water-soluble.

6. A process according to claim 1 or 2 wherein the iron salt is selected from the group consisting of an iron sulphate, an iron chloride, an iron phosphate and an iron fumarate.

7. A process according to claim 1 or 2 wherein the encapsulated iron salt is added to the curing medium so that the curing medium contains iron in an amount of from 10 ppm to 100 ppm based upon the weight of the curing medium.

8. A process according to claim 1 or 2 wherein the gelled material comprises a material selected from the group consisting of polysaccharides and gums which form gels which are substantially insoluble in water having a temperature at or below 20° C.

9. A process according to claim 1 or 2 wherein the gelled material comprises agar.

10. A process according to claim 1 or 2 wherein the gelled material comprises pectin.

11. A process according to claim 1 or 2 wherein the encapsulated iron salt comprises the iron salt in an amount of from 0.3% to 3% by weight and the gelled material comprises a gell-forming material in an amount of from 2% to 20% by weight, each weight based upon the weight of the encapsulated iron salt.

* * * * *

UNITED STATES PATENT AND TRADEMARK OFFICE
CERTIFICATE OF CORRECTION

PATENT NO. : 5,573,799
DATED : November 12, 1996
INVENTOR(S) : Dominique VILLOT, et al.

It is certified that error appears in the above-identified patent and that said Letters Patent is hereby corrected as shown below:

On the title page, under the heading [73] Assignee, "Sweden" should be --Switzerland--.

Column 1, line 66, insert a comma after "gums".

Signed and Sealed this

Eighteenth Day of February, 1997

Attest:

BRUCE LEHMAN

Attesting Officer

Commissioner of Patents and Trademarks